United States Patent [19]

Long

[11] 4,426,050
[45] Jan. 17, 1984

[54] DROPOUT FUEL TANKS AIRCRAFT

[76] Inventor: Alvin L. Long, Civilian General Delivery, Beale A.F.B., Calif. 95903

[21] Appl. No.: 253,087

[22] Filed: Apr. 13, 1981

Related U.S. Application Data

[63] Continuation-in-part of Ser. No. 71,784, Oct. 26, 1979, abandoned.

[51] Int. Cl.³ .............................................. B64D 37/12
[52] U.S. Cl. .................................. 244/135 R; 244/140
[58] Field of Search ................... 244/135 R, 140, 120, 244/137 R

[56] References Cited

U.S. PATENT DOCUMENTS

| | | | |
|---|---|---|---|
| 1,300,190 | 4/1919 | Pogolski | 244/135 R |
| 1,503,052 | 7/1924 | Kramer | 244/135 R |
| 1,535,532 | 4/1925 | Langfelder | 244/135 R |
| 1,836,319 | 12/1931 | Gehrung | 244/135 R |
| 2,764,374 | 9/1956 | Anderson et al. | 244/135 R |
| 3,006,288 | 10/1961 | Brown | 244/137 R |
| 3,057,588 | 10/1962 | Kolbe | 244/135 R |
| 3,377,037 | 4/1968 | Stewart | 244/140 |
| 3,478,904 | 11/1969 | Courter | 244/137 R |
| 3,494,248 | 2/1970 | Wenger | 244/137 A |
| 3,552,587 | 1/1971 | Warren | 244/137 R |
| 4,306,693 | 12/1981 | Cooper | 244/135 R |

FOREIGN PATENT DOCUMENTS 872789  6/1942  France ............................ 244/135 R Primary Examiner—Galen L. Barefoot

[57] ABSTRACT

A dropable main fuel tank that comprises a portion of an aircrafts lower fuselage or part of the wing structure contains all nonessential fuel for takeoff or landing. Airfoils, parachute, or rocket motor built into the main fuel tank will separate the main fuel tank from the aircraft quickly when dropped or released in a possible crash situation, thus preventing the aircraft from being consumed by its own nonessential fuel in a crash.

A nondroppable auxiliary fuel tank on the aircraft will sustain the aircraft after the main fuel tank has been dropped. The auxiliary fuel tank contains only enough fuel for takeoff and landing. Shackels and parallel tracks hold the droppable main fuel tank in place on the aircraft until the main fuel tank is released for subsequent ejection rearward. In refueling the aircraft an external control panel on the aircraft will release the main fuel tank onto a refueling vehicle for refueling at a nearby fuel dump.

3 Claims, 15 Drawing Figures

DROPOUT FUEL TANKS AIRCRAFT

This is a continuation-in-part of my co-pending application Ser. No. 071,784 filed Oct. 26, 1979, now abandoned.

SUMMARY

The present invention relates to the problem of aircraft crashing and being consumed by their own fuel, it has been estimated that two out of three people survive a air crash only to be burned to death before they can get out of the aircraft.

The present invention is a means of disposing of all nonesential fuel in landing or takeoff, for example. In taking off with a failing engine the sudden loss of weight in droping all nonesential fuel could conceiveable get a aircraft airborn instead of a flaming crash at the runway end. In landing a plane with mechanical problems could drop it's main fuel tank on the runway and land with it's small amount of auxiliary fuel. The auxiliary fuel tank is comparatively small and can be made nearly shatter proof, therefor in a crash the chances of a fuel fed fire is at a minimum.

The main fuel tank has a slowing means such as airfoils, parachute, or rocket motor built into it to separate the main fuel tank from the aircraft quickly. In a possible crash situation a pilot would have only a few seconds to release the main fuel tank so it is imperative that the main fuel tank is separated from the aircraft quickly.

Another object of the invention is to provide a faster means of refueling large aircraft, special fuel handeling vehicles could remove dropable main fuel tanks as aircraft land, when a aircraft is ready to fly again deliver full tanks to them. This system would reduce the fire hazard of aircraft siting around leaking fuel on the runway or parking area, also the refueling time of aircraft would be cut in half.

DETAILED DESCRIPTION OF THE DRAWINGS

Figure 1:
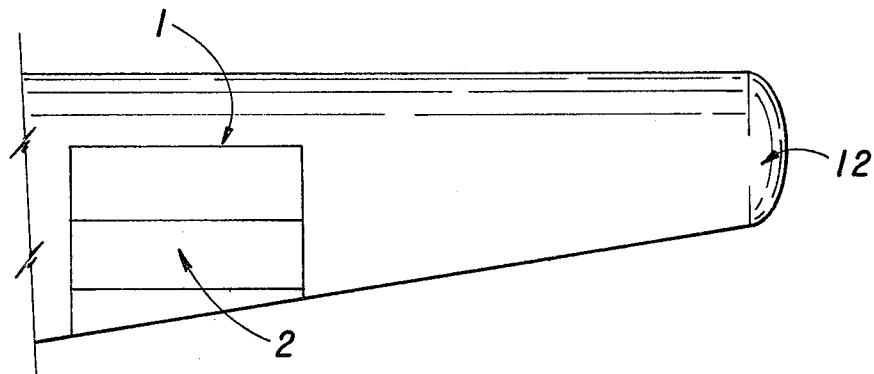
FIG. 1 is a top view of a aircraft wing with a dropout fuel tank in place.
Figure 4:
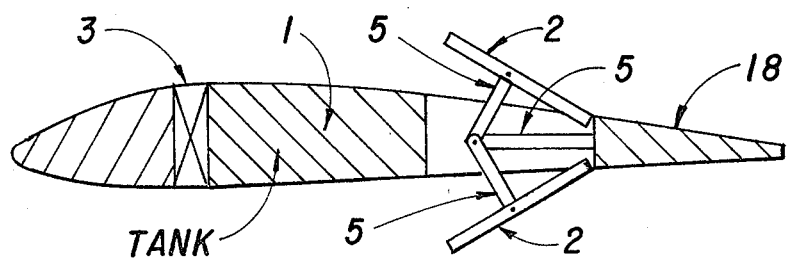
FIG. 4 is a cross section of a aircraft wing showing a dropout main fuel tank in place, it's air foils are extended.

In the drawings FIG. 1 is a aircraft wing with a dropout main fuel tank 1 in place. If the pilot decides the aircraft is in immediate danger of a crash the main fuel tank 1 can be separated from the wing instantly by appropriate pilot controlling media (not shown). The control media activates a hydraulic ram 18 in the trailing edge of the main fuel tank 1 as shown in FIG. 4. The hydraulic rod 15 is extended from the hydraulic ram 18, and arms 5 attached to the rod 15 end and to the air foils 2 force the air foils open. The shackels that hold the main fuel tank 1 in place are released by the action of the air foils (suitable shackels not shown).

The air flow over the wing surface hits the air foils 2 and exerts a tremendous pressure on them which in turn pulles the main fuel tank 1 away from the wing and to the rear of the aircraft.

The main fuel tank is guided to the rear by tracks 10, (not shown) said tracks 10 being suitable to support the main fuel tank when it is part of the wing structure, said tracks 10 are located between the sides of the main fuel tank 1 and the inner wing structure that faces the main fuel tank 1 sides.

Figure 2:
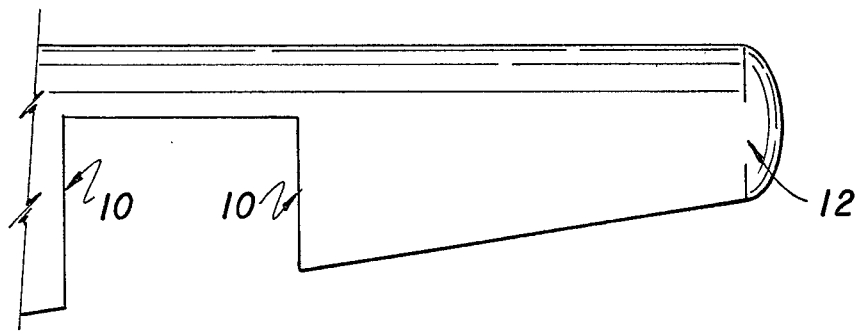
FIG. 2 is a top view of a aircraft wing it's dropout main fuel tank gone.

FIG. 2 is a aircraft wing after a crash, it's main fuel tank 1 (not shown) has been droped so no fire takes place.

Figure 3:
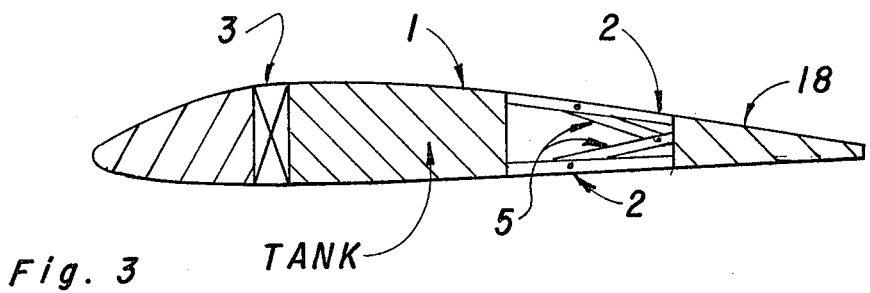
FIG. 3 is a cross section of a aircraft wing showing a dropout main fuel tank in place.

FIG. 3 is a cross section of a aircraft wing showing the main wing support 3 and a dropout main fuel tank 1 directly behind it. Airfoils 2 in this cross section are laying flat as in normal flying condition.

Appropriate initiation of means (not shown) for severing all necessary fuel lines and control connections ready the main fuel tank for the subsequent emergency ejection operation. Most aircraft crash in landing or takeoff, so in most cases the main fuel tank 1 can be droped on the runway.

Small auxiliary fuel tanks 12 in the wing ends will sustain the aircraft in flight for a short time so that the aircraft can land. If in landing or takeoff the aircraft does crash there will be very little fuel left in the auxiliary fuel tanks 12, and the chance of this fuel igniting and burning the fuselage are very small.

Figure 5:
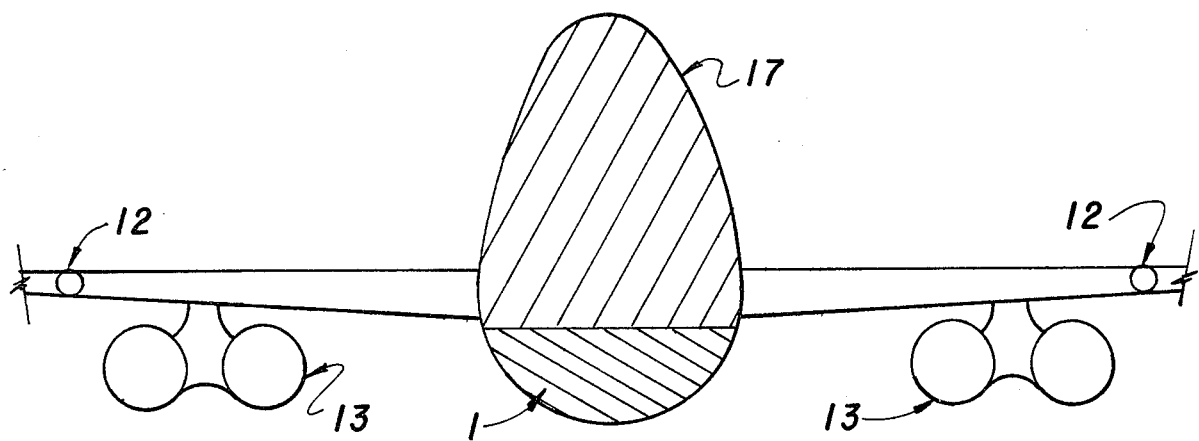
FIG. 5 is a aircraft in flight showing a front view.
Figure 6:
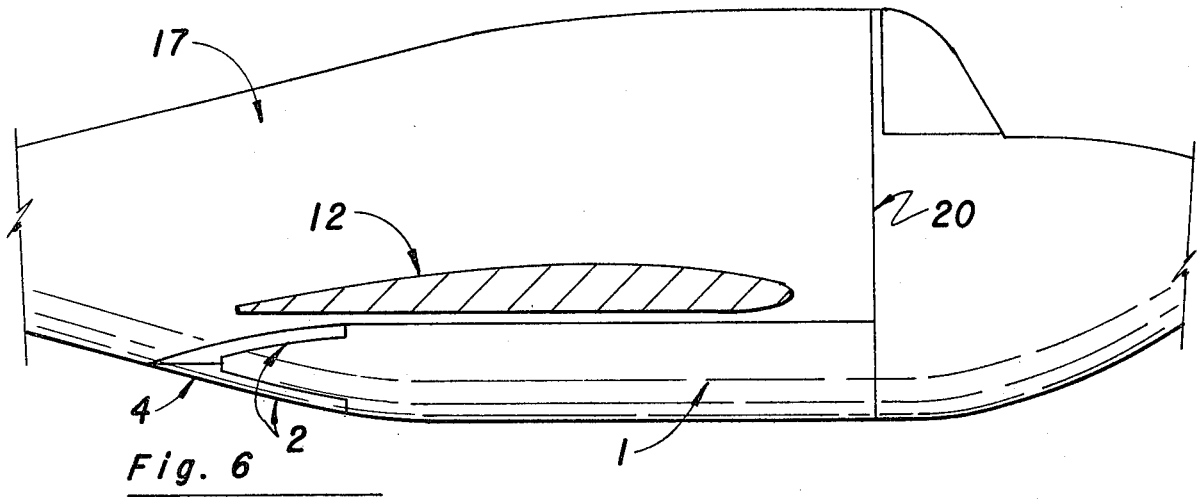
FIG. 6 is a aircraft in flight, side view.
Figure 7:
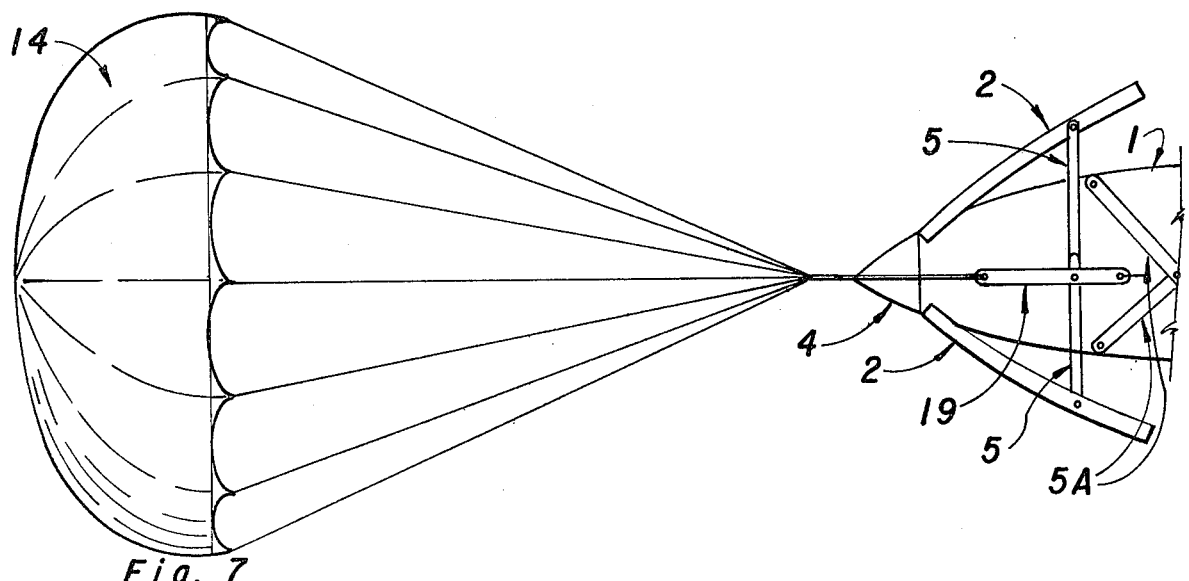
FIG. 7 is a dropout main fuel tank with it's airfoils extended and it's parachute extended.

FIG. 5 is a aircraft in flight front view and shows a lower fuselage main fuel tank 1. The main fuel tank 1 in this case has air foils 2 and parachute 14 means in combination. As shown in FIG. 6 and FIG. 7, in FIG. 5 the fuselage is shown in cross section at section line 20 in FIG. 6. For example, this aircraft is trying to takeoff with full fuel tanks 1, the pilot has discovered engine No. 13 is failing and he cannot gain height, the runway is to short to make a landing now. The pilot decides to drop his main fuel tank 1 and use his auxiliary fuel tanks 12, and does so by using appropriate pilot controlling media (not shown). As shown in FIG. 7 (a cross section of the showing means). The control media releases the cover 4 to the pilot chute which in turn pulles the pilot chute free, which in turn pulls the main parachute 14 free, which in turn pulls on a central arm 19 connected to arms 5 that force the air foils 2 open. The control media also releases the bomb release shackels or the like that hold the main fuel tank 1 in place (shackels not shown). The air flow past the aircraft catches the parachute 14 and airfoils instantly and pulls the fuel tank to the rear of the aircraft.

In FIG. 7 the arms at 5 are shown extended and holding the airfoils 2 open, at 5A they are shown in a retracted position.

With the loss of all nonessential fuel contained in the main fuel tank, the weight of the aircraft is reduced considerably and concievably the aircraft could get airborn. Small auxiliary fuel tanks 12 in the wings will sustain the aircraft until it can land.

Figure 8:
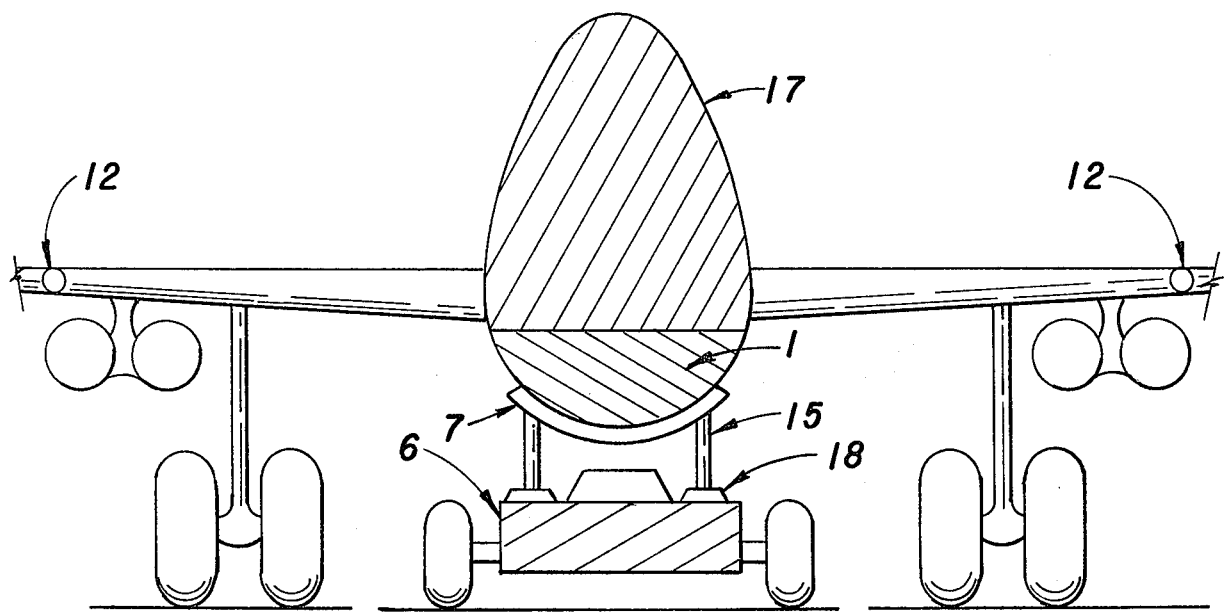
FIG. 8 is a aircraft parked on the runway, front landing gear not shown. A special fuel handling vehicle can be seen under the aircraft and in position to remove the aircraft's main fuel tank, this is a front view.
Figure 9:
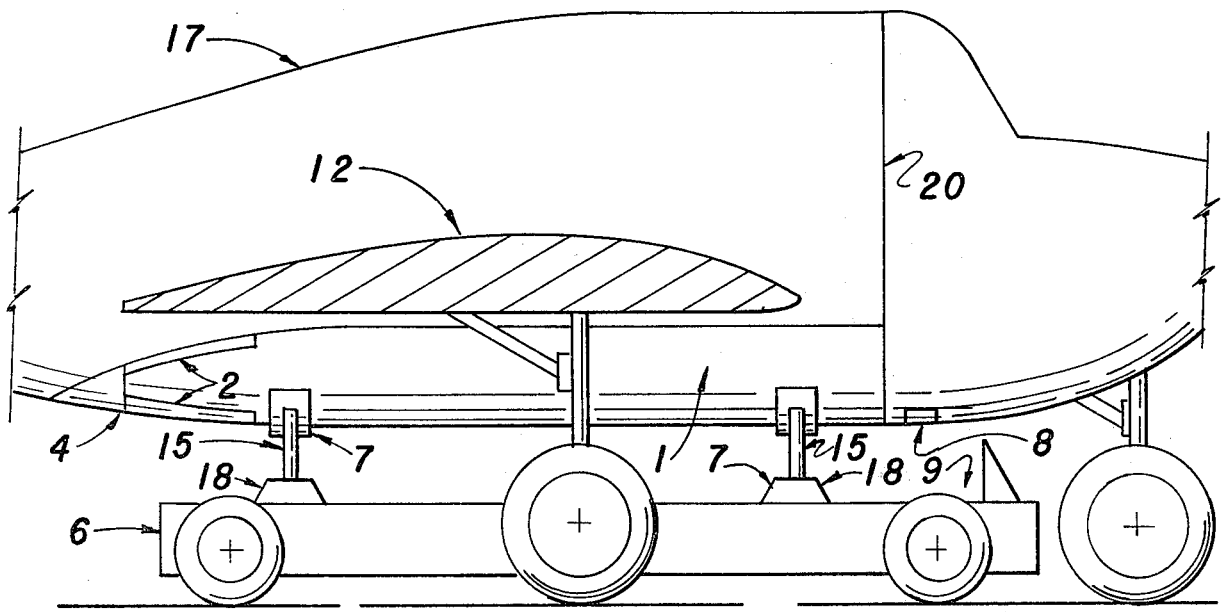
FIG. 9 is a aircraft parked on the runway side view, a special fuel handeling vehicle is under the aircraft and in position to remove the aircrafts main fuel tank.

FIG. 8 and FIG. 9 illustrate how a aircraft can be refueled by replacing it's dropable main fuel tank.

FIG. 8 is a aircraft parked on a runway, the fuselage is in cross section at section line 20, as shown in FIG. 9. The front landing gear is not shown however a low profile fuel handeling motor vehicle 6 is shown with it's hydraulic lift cradle 7 in place ready to lower the aircrafts dropout main fuel tank 1. The fuel tank 1 is released from the aircraft by appropriate initiation means for severing all necessary fuel lines and control connections, a external control pannel 8 for releasing the fuel tank 1 can be found at 8. After the fuel tank 1 has been released from the aircraft and lowered onto the fuel handeling motor vehicle 6, said vehicle 6 will proceed to a fueling station, another fuel handeling vehicle 6 will replace the fuel tank 1 removed with a similar fuel tank 1, The aircraft is ready to fly in much less time than normal refueling.

Figure 10:
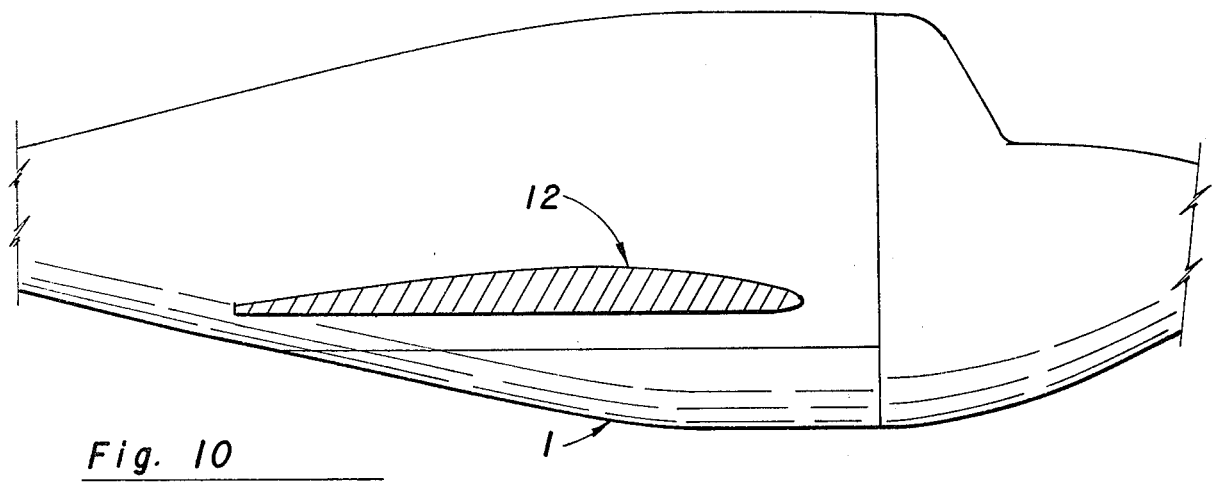
FIG. 10 is a large aircraft in flight a dropout main fuel tank can be seen in the lower portion of the fuslage.
Figure 11:
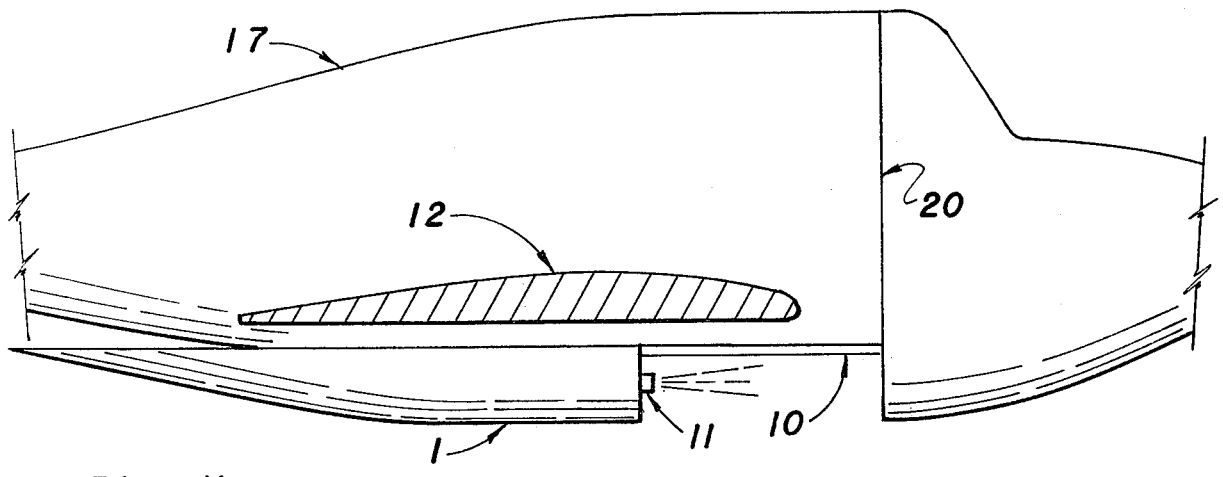
FIG. 11 is a large aircraft in flight side view, it's dropout main fuel tank has been released and it's rocket motor started, said main fuel tank is slowing down in it's forward movement as the aircraft continues forward. This fuel tank is suspended on horizontal parallel tracks to guide it's rearward movement.
Figure 12:
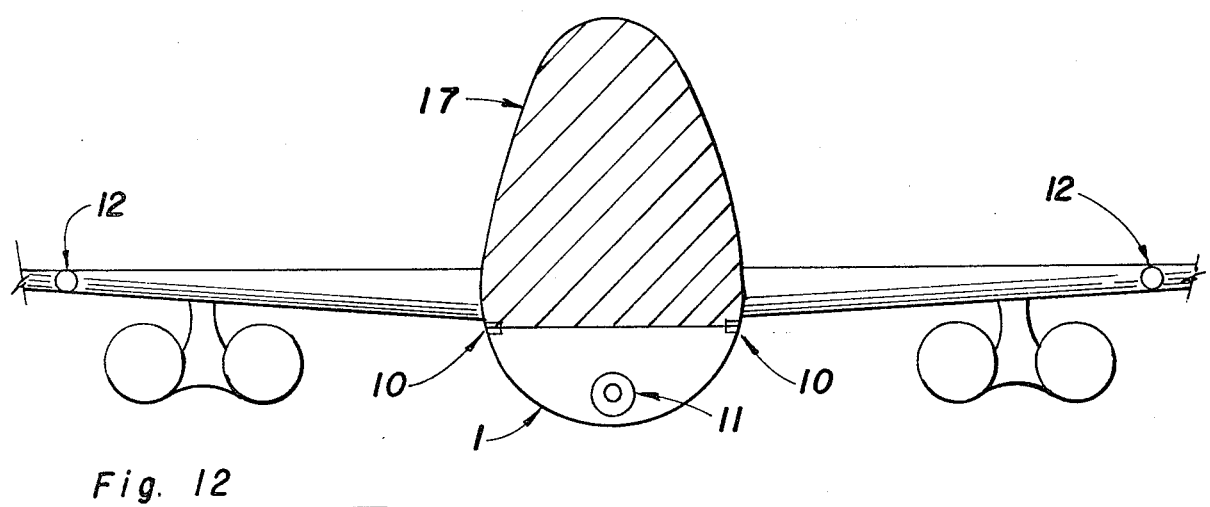
FIG. 12 is a cross section of a large aircraft and shows how the dropout main fuel tank is suspended on tracks, said tracks guiding its rearward movement. Auxiliary fuel tanks can be seen in the wings.

FIG. 9 is a side view of FIG. 8. A low profile motorized refueling vehicle 6 is shown under the aircraft 17. The refueling vehicle 6 has a operators open cockpit at 9 with easy access to the release controls pannel at 8. Vertical hydraulic rams can be seen at 18, the rams support hydraulic rods 15 which in turn support the cradles 7. FIG. 10, FIG. 11, and FIG. 12 show a aircraft with a lower fuselage main fuel tank 1 that can be separated from the aircraft by use of a rocket motor 11 mounted on the fuel tank 1, said fuel tank 1 is supported on the fuselage 17 by suitable horizontal track means 10, preferably a plurality of laterally spaced tracks 10 extend longitudinally along the top of the fuel tank. The upper track surface means on the fuselage suitably supporting a mating undersurface track means on the fuel tank.

FIG. 11 shows a side view of the aircraft. The aircrafts main fuel tank 1 can be seen seperating from the aircraft during a catapult phase of emergency ejection. A rocket motor 11 mounted on the fuel tank 1 is shown forcing the fuel tank rearward.

The pilot can seperate the main fuel tank 1 by appropriate pilot controlling media (not shown). The control media activates the rocket motor 11 and severs all necessary fuel lines and control connections for the subsequent emergency ejection operation.

FIG. 12 is a front view of FIG. 11. The fuselage is in cross section at section line 20 in FIG. 11. The rocket motor 11 can be seen on the front of the fuel tank 1, parallel tracks (end view) at 10 are shown supporting the main fuel tank 1. Auxiliary fuel tanks at 12 will sustain the aircraft after all nonessential fuel in the main fuel tank 1 has been separated from the aircraft.

Figure 13:
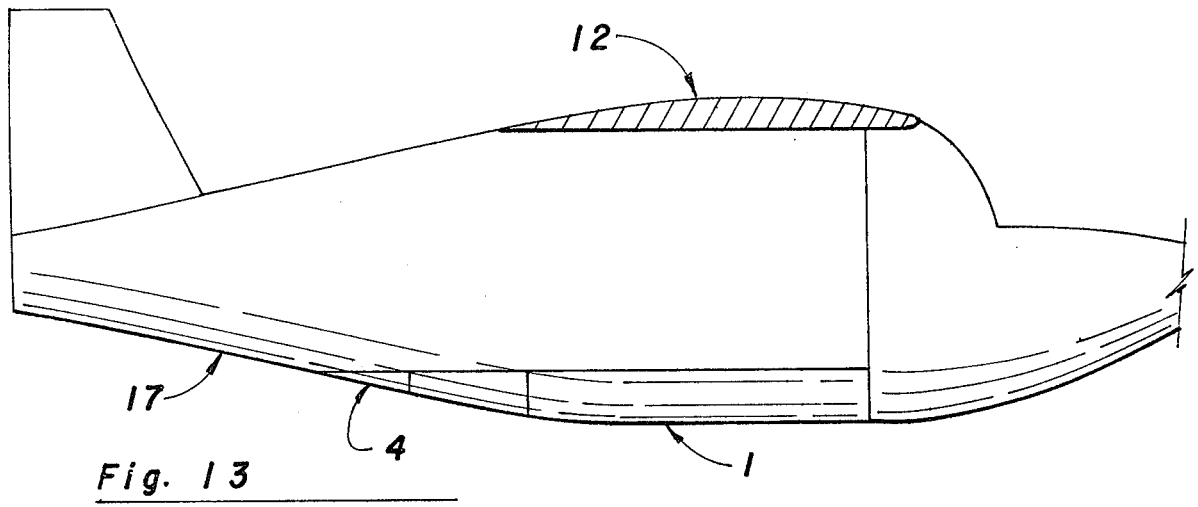
FIG. 13 is a small aircraft in flight with a dropout main fuel tank comprising a portion of it's lower fuselage, this is a side view.
Figure 14:
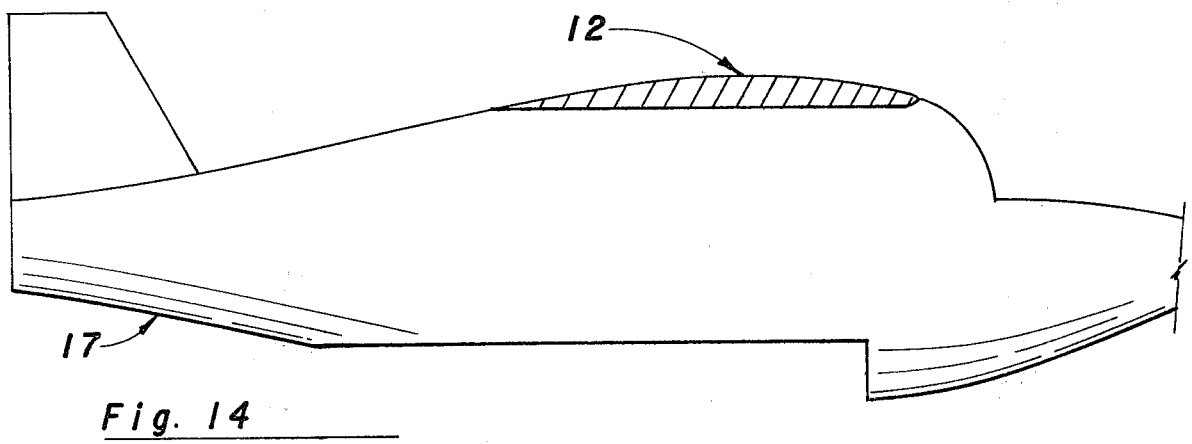
FIG. 14 is a small aircraft in flight, side view, said small aircraft has droped it's main fuel tank.
Figure 15:
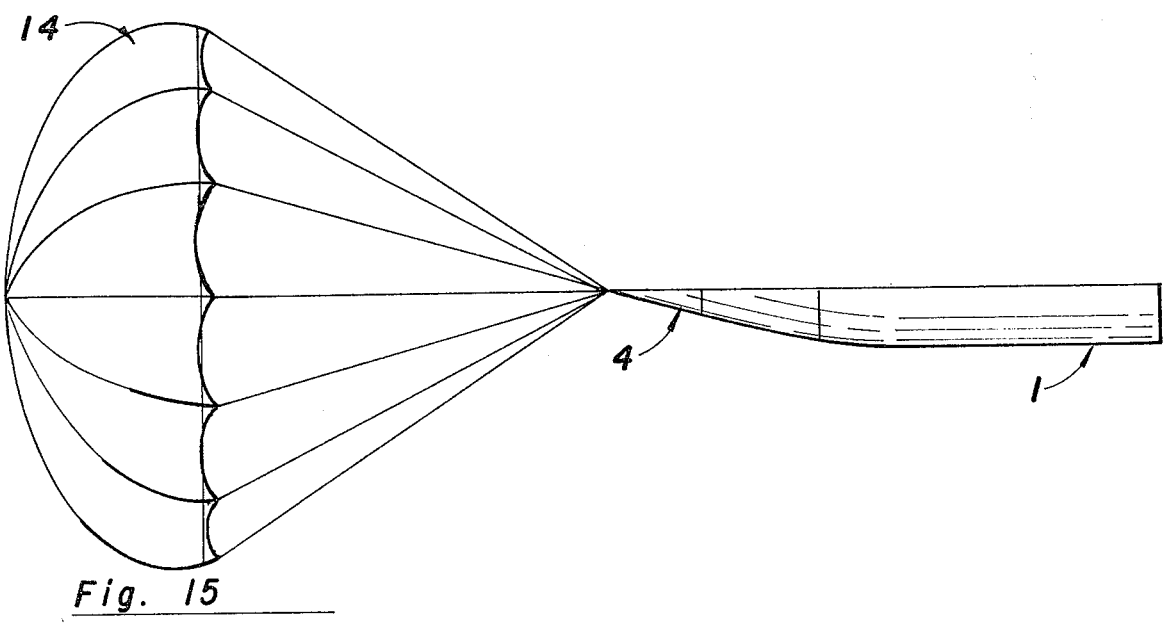
FIG. 15 is a dropout main fuel tank from a small aircraft, side view, a parachute is slowing it's forward movement.

FIG. 13, FIG. 14 and FIG. 15 illustrate how a small aircraft can use a dropable main fuel tank.

FIG. 13 is a small aircraft in flight, a dropable main fuel tank 1 can be seen comprizing a portion of the lower fuselage. This fuel tank 1 has a parachute 14 to slow it's forward movement when droped in a possible crash situation. The fuel tank 1 is supported on the fuselage 17 by suitable bomb release shackels or the like (not shown).

The pilot can seperate the main fuel tank 1 by appropriate pilot controlling media (not shown). The control media releases the spring loaded cover 4 to the pilot chute which pulles the pilot chute free, which in turn pulles the main parachute free, 14 which in turn releases the shackels that hold the fuel tank 1 in place. The control media also severs all necessary fuel lines and control connections for the subsequent emergency ejection operation.

FIG. 14 shows the aircraft of FIG. 13 after emergency ejection of all nonessential fuel in the main fuel tank 1, the aircraft is now sustained in flight by auxiliary fuel tanks 12 in the wing, preferably mounted in the wing tips as far from the passenger compartment as possible.

FIG. 15 is a dropable main fuel tank 1 after ejection from FIG. 14. The fuel tank 1 is being slowed in it's forward movement and will subsequently be lowered to the ground intact (alditude permiting).

As in all cases where an aircraft is equipped with a dropable main fuel tank 1 and a nondropable auxiliary fuel tank 12, the auxiliary fuel tank 12 contains only enoughf fuel for a normal landing or takeoff. As such they are small and can be constructed nearly shatterproof, preferably the auxiliary fuel tank is carried in the wing tip as far from the passenger compartment as possible.

The pilot control media will regulate the amount of fuel in the auxiliary fuel tank 12. Fuel lines (not shown) will allow the auxiliary fuel tank 12 to be completely drained into the main fuel tank 1, for subsequent removing of all fuel from the aircraft, in parking the aircraft, all fuel can be removed from it by removing the aircrafts main fuel tank 1. When the aircraft is ready to fly again auxiliary fuel tanks 12 can be refilled from the main fuel tank 1.

What is claimed is:

1. An aircraft comprising wings, fuselage, auxiliary fuel tanks on the wings and a main dropout fuel tank releasably mounted on and forming a portion of said aircraft and having catapulting means mounted on said main dropout fuel tank;

horizontal track means on said aircraft for mounting said main dropable tank and running longitudinally of said aircraft, said catapulting means mounted on said main tank for ejecting said main tank rearwardly along said track means, said catapulting means being operated from the pilot's cabin and comprising airfoils pivotally mounted to said main tank and further comprising parachute means connected to said airfoil means for deploying said airfoil means to forceably eject said main tank away from said aircraft;

said auxiliary fuel tank containing sufficient fuel to operate said aircraft for a safe landing after said main tank has been ejected;

external control means on said aircraft for externally releasing said main fuel tank on the ground so that said aircraft can be refueled by replacement with another dropable main fuel tank filled with fuel.

2. In an aircraft as in claim 1 wherein said portion of said aircraft is a portion of said wing with said main tank forming a trailing edge, portion of said wing.

3. In an aircraft as in claim 1 wherein said portion of said aircraft is a portion of said fuselage with said main tank forming a portion of the lower surface of said fuselage.

* * * * *